Patented Dec. 3, 1940

2,223,664

UNITED STATES PATENT OFFICE 2,223,664

MANUFACTURE OF A NAPHTHALENE DERIVATIVE

Walter Salzer, Wuppertal-Elberfeld, Germany, assignor to Winthrop Chemical Company, Inc., New York, N. Y., a corporation of New York No Drawing. Application May 16, 1939, Serial No. 274,007. In Germany May 17, 1938

7 Claims. (Cl. 260—590)

This invention relates to a new naphthalene derivative and to a process of manufacturing the same.

2-keto-1,2,3,4-tetrahydronaphthalenes hitherto could not be prepared in a convenient and satisfactory manner. $\Delta_1$- and $\Delta_2$-dihydronaphthalenes, for instance, yield when treated with perbenzoic acid the corresponding oxides; 1,2,3,4-tetrahydronaphthalene-1,2-oxide has been converted into 2-keto-tetrahydronaphthalene only in a very cumbersome manner and with an unsatisfactory yield. Also other methods for preparing 2-keto-tetrahydronaphthalenes are very inconvenient.

The present invention provides for a process by which a 2-keto-tetrahydronaphthalene is obtained in a convenient manner. In accordance with the invention it is most surprizing that the 2-keto-1,2,3,4-tetrahydro-6-methoxy-naphthalene is formed in a good yield when reacting upon 3,4-dihydro-6-methoxynaphthalene with perbenzoic acid or with perphthalic acid; 1,2,3,4-tetrahydro-6-methoxynaphthalene-1,2-oxide is obtained only as a by-product. The reaction is carried out in the presence of a solvent which is inert to the initial-materials, such as methylenechloride, chloroform, carbontetrachloride, ether, benzene, toluene, tetrahydronaphthalene and the like. The 2-keto-1,2,3,4-tetrahydro-6-methoxynaphthalene is separated from the reaction product preferably in the form of a ketoderivative; the bisulfite compound obtained by reacting upon the reaction product with an alkali metal bisulfite in the usual manner, has proved to be most suitable for this purpose. The bisulfite compound is again split off to the ketone in the customary manner, for instance by treatment with dilute mineral acids or alkali metal carbonate solutions.

The 3,4-dihydro-6-methoxynaphthalene serving as starting-material is obtained by reducing 1-keto-1,2,3,4-tetrahydro-6-methoxynaphthalene to the corresponding 1-hydroxy-compound and subsequently splitting off water. The said starting-material boils under 1 mm. pressure at 103° C.

The invention is illustrated by the following examples, the parts being by weight:

Example 1

80 parts of 3,4-dihydro-6-methoxynaphthalene are treated while cooling with ice-water with 2000 parts of a 0.5 normal solution of perbenzoic acid in methylene chloride. Thereby the temperature rises from 0° up to 10° C. After 4 hours the perbenzoic acid has been used up. The benzoic acid is shaken out with 2-normal sodium hydroxide solution, the methylene chloride solution washed with water and distilled after drying with sodium sulfate. The ketone formed apart from the oxide is separated by way of the crystallized bisulfite compound from the distillate having passed from 110 to 135° C. under 0.8 mm. pressure. The bisulfite compound is decomposed in the manner known per se, for instance by treatment with dilute sulfuric acid or potassium carbonate solution. The 2-keto-1,2,3,4-tetrahydro-6-methoxynaphthalene is obtained as an oil boiling at 135° C. under 0.8 mm. pressure. It solidifies to crystals when being stored. The semicarbazone melts at 159° C.

Example 2

8 grams of 3,4-dihydro-6-methoxynaphthalene are introduced at 0 to 5° C. into 200 ccs. of an ethereal solution containing 10.9 grams of perphthalic acid. After 12 hours' storage in ice-water the ethereal solution is first washed with 2-normal sodium hydroxide solution and subsequently with water. The ethereal solution is then shaken with a concentrated aqueous sodium bisulfite solution. Thereupon the bisulfite compound of the 2-keto-1,2,3,4-tetrahydro-6-methoxynaphthalene separates in crystals. This product is further treated as indicated in Example 1.

I claim:

1. The process which comprises oxidizing 3,4-dihydro-6-methoxynaphthalene with a compound selected from the group consisting of perbenzoic and perphthalic acids in the presence of an organic solvent which is inert to the initial materials.

2. Process as claimed in claim 1 in which the 2-keto-1,2,3,4-tetrahydro-6-methoxynaphthalene formed is subsequently converted into an alkali metal salt of the corresponding hydroxy sulfonic acid by treating the reaction product with an alkali metal bisulfite.

3. The process which comprises oxidizing 3,4-dihydro-6-methoxynaphthalene with perbenzoic acid in the presence of an organic solvent which is inert to the initial materials.

4. Process as claimed in claim 3 in which the 2-keto-1,2,3,4-tetrahydro-6-methoxynaphthalene formed is subsequently converted into an alkali metal salt of the corresponding hydroxy sulfonic acid by treating the reaction product with an alkali metal bisulfite.

5. The process which comprises oxidizing 3,4-dihydro-6-methoxynaphthalene with perphthalic acid in the presence of an organic solvent which is inert to the initial materials.

6. Process as claimed in claim 5 in which the 2-keto-1,2,3,4-tetrahydro-6-methoxynaphthalene formed is subsequently converted into an alkali metal salt of the corresponding hydroxy sulfonic acid by treating the reaction product with an alkali metal bisulfite.

7. 2-keto-1,2,3,4-tetrahydro-6-methoxynaphthalene.

WALTER SALZER.